United States Patent
Mercer

(10) Patent No.: US 7,408,271 B2
(45) Date of Patent: Aug. 5, 2008

(54) POWER INTERFACE BOX

(76) Inventor: Barton P. Mercer, 6114 Prospect St., Fredericksburg, VA (US) 22407

( * ) Notice: Subject to any disclaimer, the term of this patent is extended or adjusted under 35 U.S.C. 154(b) by 471 days.

(21) Appl. No.: 10/860,107

(22) Filed: Jun. 3, 2004

(65) Prior Publication Data
US 2005/0269881 A1 Dec. 8, 2005

(51) Int. Cl.
*H05K 1/02* (2006.01)
(52) U.S. Cl. .............................. 307/42; 307/17; 307/64
(58) Field of Classification Search .................. 307/42, 307/17, 64
See application file for complete search history.

(56) References Cited

U.S. PATENT DOCUMENTS

| | | | | |
|---|---|---|---|---|
| 4,814,929 | A | 3/1989 | Ashley | 361/1 |
| 5,089,937 | A | 2/1992 | Carrubba et al. | 361/394 |
| 5,450,469 | A | 9/1995 | Pamart et al. | 379/27 |
| 5,637,933 | A | 6/1997 | Rawlings et al. | 307/147 |
| 5,694,312 | A * | 12/1997 | Brand et al. | 363/144 |
| 6,121,765 | A * | 9/2000 | Carlson | 323/359 |
| 6,376,937 | B1 | 4/2002 | Stewart | 307/125 |
| 6,376,938 | B1 | 4/2002 | Williams | 307/150 |
| 2004/0001292 | A1 | 1/2004 | Vanderkolk | 361/42 |

FOREIGN PATENT DOCUMENTS

GB  2 257 573 A  1/1993

OTHER PUBLICATIONS

Carolina Products, Inc., Electronic Power Protection System, Product Bulletin, 1999, 6 pgs.
W.A. Brown, Power Manager—25APC, New Product Bulletin, Oct. 2002, 4 pgs.
Power Box Solutions, LLC, Power Distribution Center, Instruction Bulletin, Aug. 2002, 9 pgs., Salisbury, USA.

* cited by examiner

*Primary Examiner*—Michael J Sherry
*Assistant Examiner*—Carlos Amaya
(74) *Attorney, Agent, or Firm*—Adams Intellectual Property Law, P.A.

(57) ABSTRACT

An isolated ground interface apparatus for providing a remote termination point for isolated ground conductors. The isolated ground interface apparatus includes an isolation transformer, a plurality of isolated ground receptacles, and an electrical interface. The isolation transformer establishes a neutral to ground bond and thereby prevents transmission of a common mode voltage from an input power supply to an electrical device. A plurality of isolated ground receptacles provides a separate ground reference point from a chassis ground for preventing transmission of electrical noise to the electrical device. The electrical interface electrically interconnects the isolation transformer, the input power supply, and the plurality of isolated ground receptacles together. The input power supply transmits an electrical current through the electrical interface to the isolation transformer. The isolation transformer provides an isolated ground through the electrical interface to the isolated ground conductor electrically connected to the separate ground reference point of the plurality of isolated ground receptacles. A method of providing electrical current supplied by an input power supply to a plurality of isolated ground receptacles using the electrical interface in a normal mode and a bypass mode.

16 Claims, 7 Drawing Sheets

POWER INTERFACE BOX

TECHNICAL FIELD AND BACKGROUND OF THE INVENTION

This invention relates to a separately derived isolated ground interface apparatus and more particularly to a power interface box for connecting isolated ground (IG) receptacles at a termination point remote from the main electrical service entrance of the facility.

Isolated ground receptacles, typically orange in color, are used with critical electronic systems to provide a separate ground reference point from the safety or chassis ground required to protect personnel from short circuit voltages in the conduit/raceway system. Critical electronic systems include, but are not limited to, point of sale networks, fueling management systems, computer networks, telecom systems, security systems, automatic teller machines (ATM), internet kiosks, and self checkout point of sale networks.

Typically, an isolated ground conductor must be routed back to the electrical service entrance grounding terminal of a facility exposing the isolated ground conductor to electrical contamination (noise) by induced voltages from other parallel current carrying conductors that are run in the same conduits, raceways, and panelboards. This electrical contamination compromises the true isolation of the isolated ground conductor thereby reducing its effectiveness.

The electrical contamination can cause damage, non-operation, or misoperation of electronic components as a result of poor isolation in the grounding path. Thus, there exists a need for a separate termination point for the isolated ground conductor remote of the main service entrance to prevent electrical contamination.

The National Electrical Code (NEC) allows for alternate wiring of the isolated ground conductor to terminate at a separately derived apparatus. A separately derived apparatus is produced by using an isolation transformer which has separate primary and secondary windings used to provide protection from common mode electrical contamination. The isolation transformer provides an inductive cushion by establishing a neutral to ground bond. This bond prevents the formation and transmission of common mode voltages to electrical devices, such as the critical electronic systems listed above. The separately derived apparatus, therefore, can be used to eliminate electrical contamination associated with long runs of an isolated ground conductor.

The present invention addresses these problems by providing a separately derived isolated ground interface apparatus utilizing a power interface box capable of providing an interface between the isolation transformer and the remote, hard wired isolated ground receptacles. Thus, the isolated ground interface apparatus provides isolated ground receptacles with a separately derived isolated ground free of electrical contamination.

SUMMARY OF THE INVENTION

Therefore, it is an object of the invention to provide an isolated ground interface apparatus for eliminating electrical contamination of an isolated ground conductor.

It is another object of the invention to provide an isolated ground interface apparatus that eliminates the need to run an isolated ground conductor back to the main electrical service entrance of the facility.

It is another object of the invention to provide an isolated ground interface apparatus with a power interface box for providing an interface between an isolation transformer and an isolated ground receptacle.

It is another object of the invention to provide an isolated ground interface apparatus with an isolation transformer for preventing the transmission of common mode voltages.

It is another object of the invention to provide an isolated ground interface apparatus with an uninterruptible power supply that has an integral isolation transformer.

It is another object of the invention to provide an isolated ground interface apparatus with isolated ground receptacles.

These and other objects of the present invention are achieved in the preferred embodiments disclosed below by providing an isolated ground interface apparatus for providing a remote termination point for isolated ground conductors. The isolated ground interface apparatus includes an isolation transformer for establishing a neutral to ground bond and thereby preventing transmission of a common mode voltage from an input power supply to an electrical device; at least one isolated ground receptacle for providing a separate ground reference point from a chassis ground for preventing transmission of electrical noise to the electrical device; and an electrical interface for electrically interconnecting the isolation transformer, the input power supply, and the at least one isolated ground receptacle together, whereby the input power supply transmits an electrical current through the electrical interface to the isolation transformer, the isolation transformer providing an isolated ground through the electrical interface to the isolated ground conductor electrically connected to the separate ground reference point of the at least one isolated ground receptacle.

According to another preferred embodiment of the invention, the isolated ground interface apparatus further includes an emergency power off switch for disconnecting the electrical current supplied from the isolation transformer to the isolated ground receptacles.

According to another preferred embodiment of the invention, the electrical device includes an electronic device selected from the group consisting of point of sale networks, fueling management systems, computer networks, telecom systems, security systems, automatic teller machines, and internet kiosks.

According to another preferred embodiment of the invention, the electrical interface includes a bypass switch for bypassing the isolation transformer for allowing service and maintenance to be performed without disrupting the electrical current transmitted to the isolated ground receptacles.

According to another preferred embodiment of the invention, the electrical interface includes at least one isolated ground termination block for electrically connecting the at least one isolated ground receptacle to the electrical interface.

According to another preferred embodiment of the invention, the electrical interface includes a female receptacle for receiving a male plug from the isolation transformer.

According to another preferred embodiment of the invention, the electrical interface includes an input power termination block for electrically connecting the electrical current supplied by the input power supply to the electrical interface.

According to another preferred embodiment of the invention, the electrical interface includes an emergency power off termination block for electrically connecting the emergency power off switch for disconnecting the electrical current supplied from the isolation transformer to the isolated ground receptacles.

According to another preferred embodiment of the invention, the electrical interface includes a male plug for connecting the electrical interface to the isolation transformer.

According to another preferred embodiment of the invention, an isolated ground interface apparatus for providing a remote termination point for isolated ground conductors includes an isolation transformer for establishing a neutral to ground bond and thereby preventing transmission of a common mode voltage from an input power supply to an electronic device; a battery backup for providing an uninterruptible power supply to the electronic device; at least one isolated ground receptacle for providing a separate ground reference point from a chassis ground for preventing transmission of electrical noise to the electronic device; and an electrical interface for electrically interconnecting the isolation transformer, the input power supply, and the at least one isolated ground receptacle together, whereby the input power supply transmits an electrical current through the electrical interface to the isolation transformer, the isolation transformer providing an isolated ground through the electrical interface to the isolated ground conductor electrically connected to the separate ground reference point of the at least one isolated ground receptacle. The electrical interface includes at least one isolated ground termination block for electrically connecting the at least one isolated ground receptacle to the electrical interface; an input power termination block for electrically connecting the electrical current supplied by the input power supply to the electrical interface; and a female receptacle for receiving a male plug from the isolation transformer.

According to another preferred embodiment of the invention, the electrical interface includes a male plug for electrically connecting the electrical interface to the isolation transformer.

According to another preferred embodiment of the invention, an electrical interface for an isolated ground interface apparatus having an isolation transformer, an input power supply, and at least one isolated ground receptacle, the electrical interface includes an input power termination block for electrically connecting an electrical current supplied by the input power supply to the electrical interface; at least one isolated ground termination block for electrically connecting the at least one isolated ground receptacle to the electrical interface; a male plug for connecting the electrical interface to the isolation transformer; and a female receptacle for receiving a male plug from the isolation transformer.

According to another preferred embodiment of the invention, the electrical interface further includes a bypass switch for bypassing the isolation transformer for allowing service and maintenance to be performed without disrupting the electrical current supplied by the input power supply to the isolated ground receptacles.

According to another preferred embodiment of the invention, the interface further includes an emergency power off termination block for electrically connecting an emergency power off switch for disconnecting the electrical current supplied from the isolation transformer to the isolated ground receptacles.

According to another preferred embodiment of the invention, a method of providing electrical current supplied by an input power supply to at least one isolated ground receptacle through an isolation transformer using an electrical interface, the electrical interface having a normal mode, wherein the steps of transmitting electrical current to the at least one isolated ground receptacle in the normal mode includes transmitting the electrical current from the input power supply to the electrical interface for transmission of the electrical current to the isolation transformer; transmitting the electrical current from the electrical interface to the isolation transformer for establishing a neutral to ground bond and thereby preventing transmission of a common mode voltage from the input power supply to an electrical device; transmitting the electrical current from the isolation transformer to the electrical interface for transmission of the electrical current to the at least one isolated ground receptacle; transmitting the electrical current from the electrical interface to the at least one isolated ground receptacle for transmission of the electrical current to the electrical device; and a bypass mode, wherein the steps of transmitting electrical current to the at least one isolated ground receptacle in bypass mode includes transmitting the electrical current supplied by the input power supply to the electrical interface for transmission of the electrical current to the at least one isolated ground; and transmitting the electrical current from the electrical interface to the at least one isolated ground for transmission of the electrical current to the electrical device.

According to another preferred embodiment of the invention, the electrical device includes an electronic device selected from the group consisting of point of sale networks, fueling management systems, computer networks, telecom systems, security systems, automatic teller machines, and internet kiosks.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
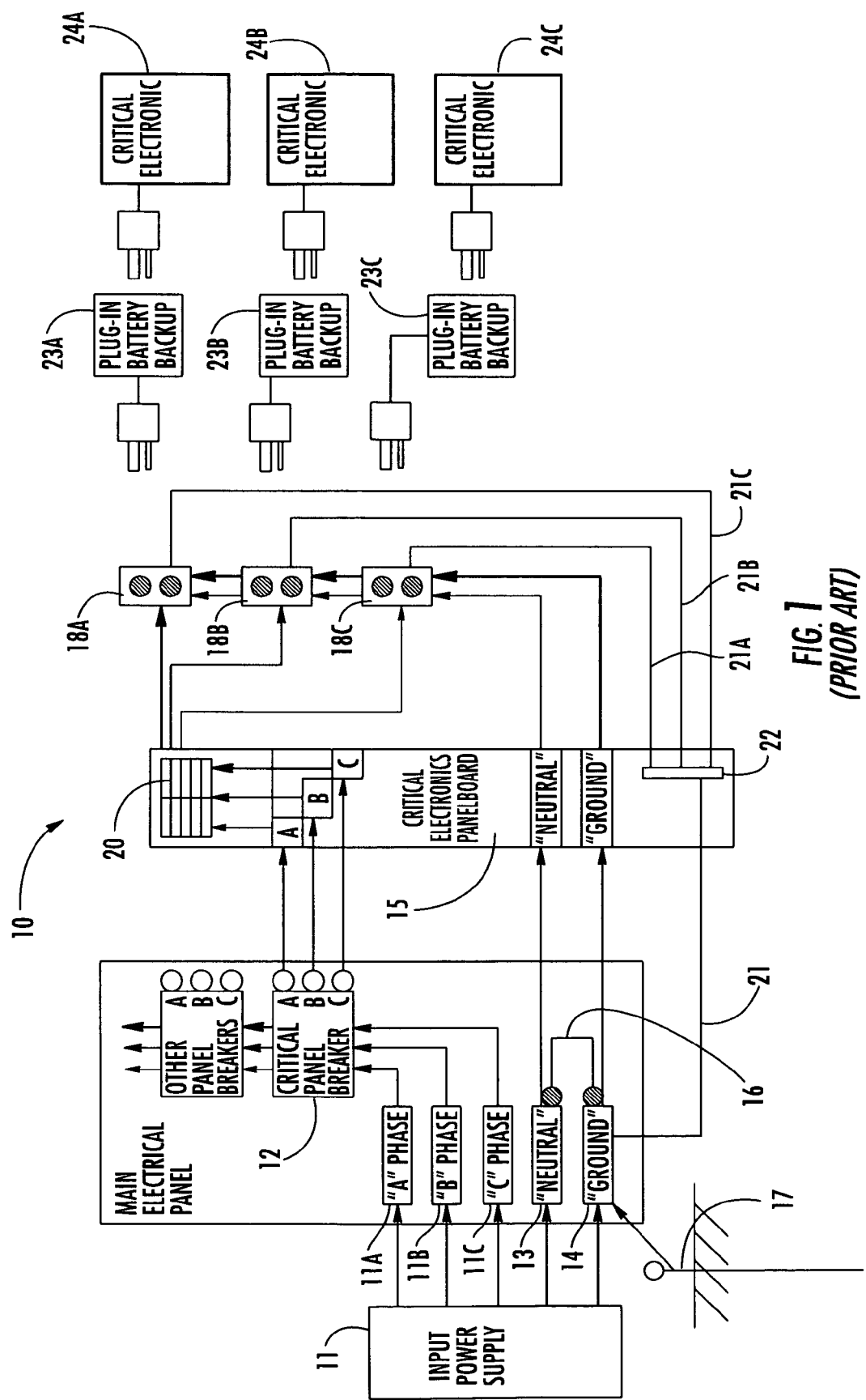
FIG. 1 shows a prior art apparatus for grounding isolated ground receptacles.

Referring now specifically to the drawings, a prior art apparatus for providing an uninterruptible power supply to isolated ground receptacles for critical electronics is illustrated in FIG. 1 and shown generally at reference numeral 10.

As shown in FIG. 1, electrical current from an input power supply 11 is supplied to a critical panel breaker 12. The electrical current is supplied in three phases 11A, 11B, and 11C. A neutral 13 and ground 14 of the input power supply 11 are supplied to a critical electronics panelboard 15. The neutral 13 and ground 14 form a neutral to ground bound 16. In addition, ground 14 is connected to a grounding electrode system 17 for the facility to provide an isolated ground to the isolated ground receptacles 18A, 18B, and 18C.

The electrical current 11A, 11B, and 11C are transmitted from the critical panel breaker 12 to the critical electronics panelboard 15 where circuit breakers 20 transmit electrical current 11A to isolated ground receptacle 18A, electrical current 11B to isolated ground receptacle 18B, and electrical current 11C to isolated ground receptacle 18C. The neutral 13 and ground 14 are also connected to isolated ground receptacles 18A, 18B, and 18C.

The isolated ground is supplied from the ground 14 via isolated ground conductor 21 to an isolated ground termination block 22 located within the critical electronics panelboard 15. The isolated ground termination block 22 splits the isolated ground conductor 21 into multiple isolated ground conductors 21A, 21B, and 21C to supply an isolated ground to each of the isolated ground receptacles 18A, 18B, and 18C. Plug-in battery backups 23A, 23B, and 23C are plugged into isolated ground receptacles 18A, 18B, and 18C to provide a battery backup to critical electronics 24A, 24B, and 24C.

Figure 2:
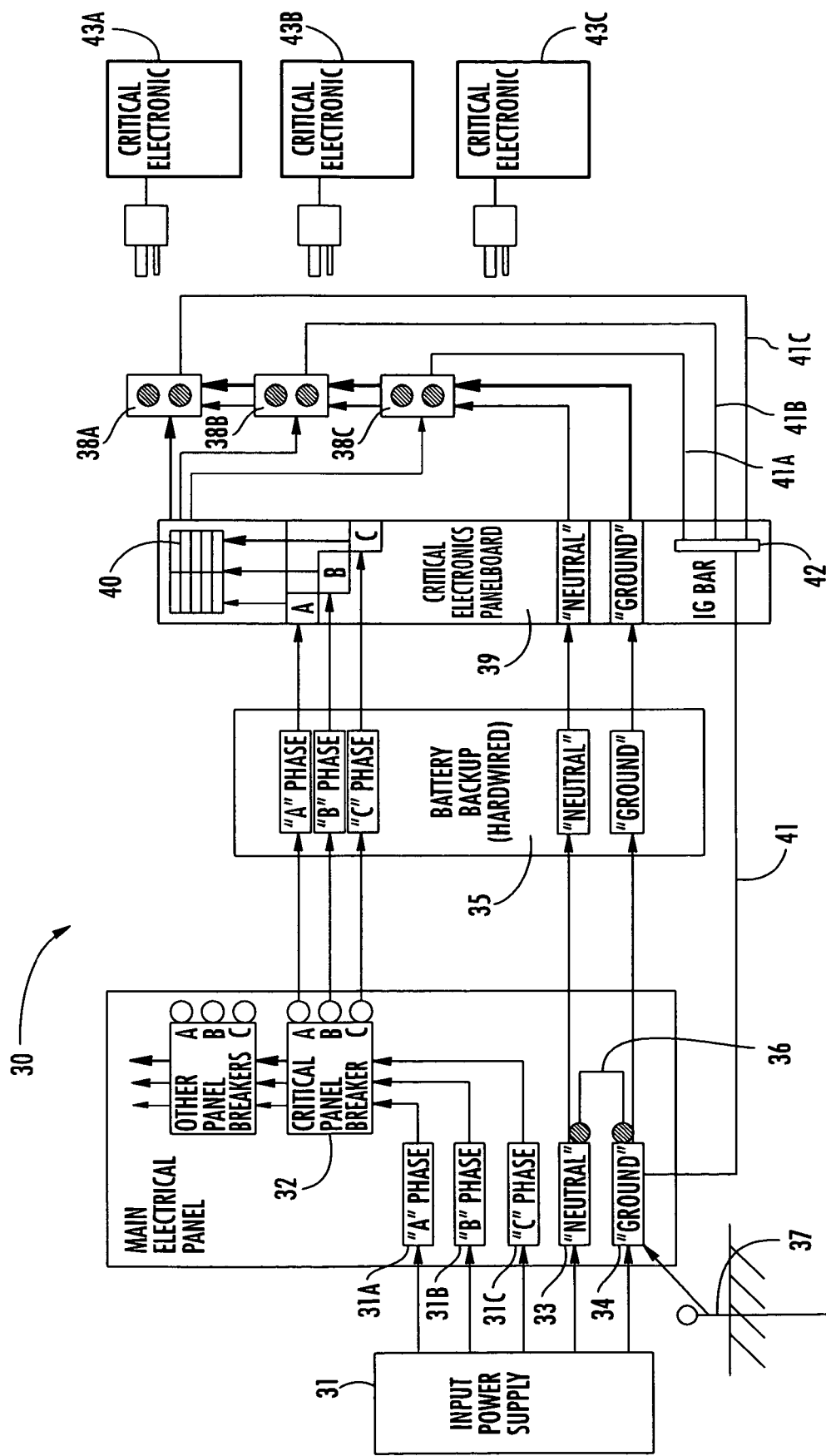
FIG. 2 shows a prior art apparatus for grounding isolated ground receptacles.

FIG. 2 shows another prior art apparatus for providing an uninterruptible power supply to isolated ground receptacles for critical electronics and is shown generally at 30. Electrical current from an input power supply 31 is supplied to a critical panel breaker 32. The electrical current is supplied in three phases 31A, 31B, and 31C. A neutral 33 and ground 34 of the input power supply 31 are supplied to a central hardwired battery backup 35. The neutral 33 and ground 34 form a neutral to ground bound 36. In addition, ground 34 is connected to a grounding electrode system 37 for the facility to provide an isolated ground to isolated ground receptacles 38A, 38B, and 38C.

The electrical current 31A, 31B, and 31C are transmitted from the critical panel breaker 32 to the central hardwired battery backup 35. The electrical current 31A, 31B, and 31C are then transmitted to the critical electronics panelboard 39 where circuit breakers 40 transmit electrical current 31A to isolated ground receptacle 38A, electrical current 31B to isolated ground receptacle 38B, and electrical current 31C to isolated ground receptacle 38C. The neutral 33 and ground 34 are also connected to isolated ground receptacles 38A, 38B, and 38C.

The isolated ground is supplied from the ground 34 via isolated ground conductor 41 to an isolated ground termination block 42 located within the critical electronics panelboard 39. The isolated ground termination block 42 splits the isolated ground conductor 41 into multiple isolated ground conductors 41A, 41B, and 41C to supply an isolated ground to each of the isolated ground receptacles 38A, 38B, and 38C. Critical electronics 43A, 43B, and 43C are then plugged into isolated ground receptacles 38A, 38B, and 38C to provide a battery backup to critical electronics 43A, 43B, and 43C.

Figure 3:
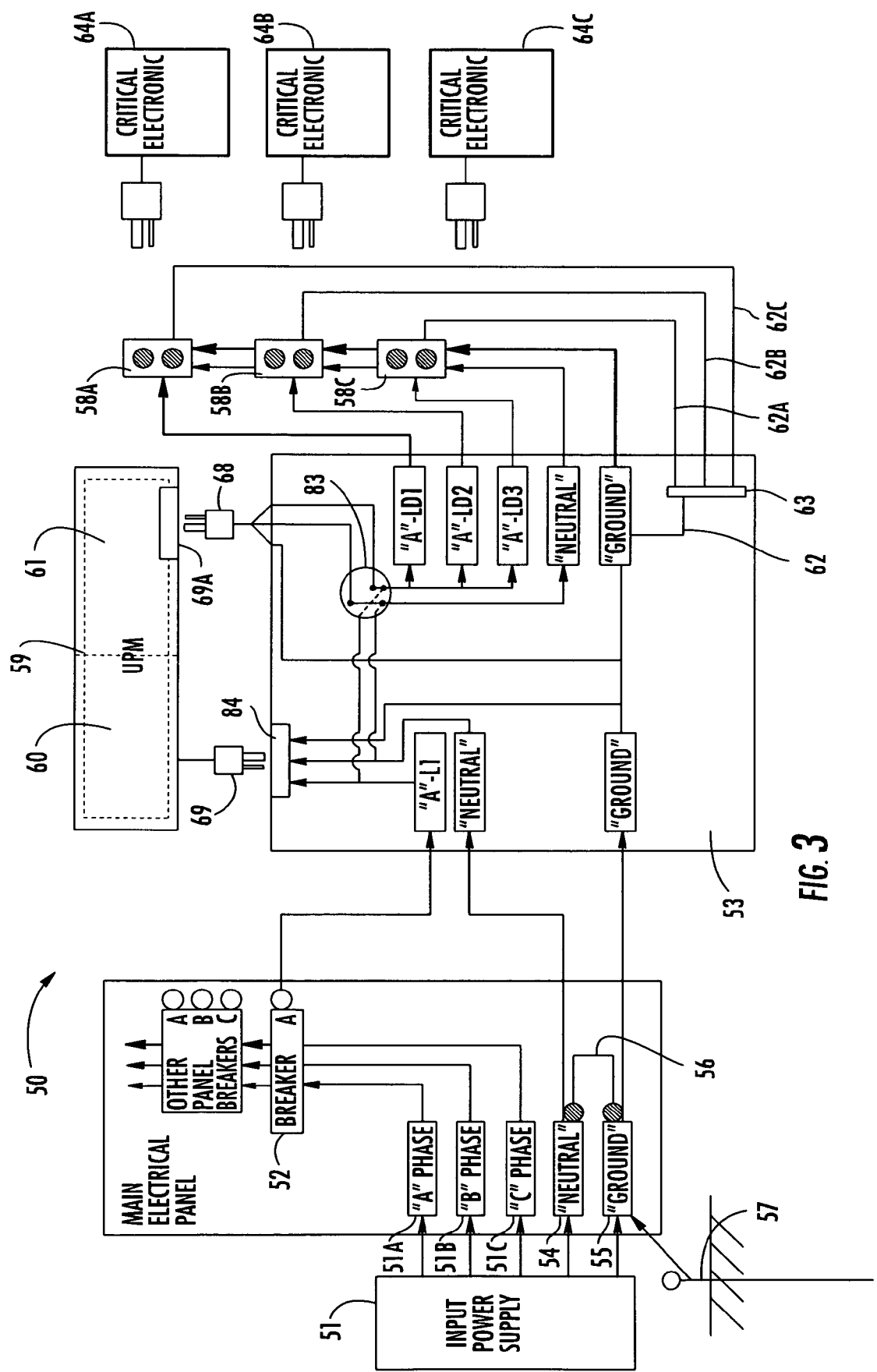
FIG. 3 shows an apparatus for grounding isolated ground receptacles according to the preferred embodiment of the present invention.

FIG. 3 illustrates schematically a separately derived isolated ground interface apparatus 50 according to a preferred embodiment of the present invention for providing an uninterruptible power supply to isolated ground receptacles for critical electronics. The apparatus 50 eliminates the need to run an isolated ground conductor back to the main service entrance preventing the isolated ground conductor from being subjected to electrical contamination associated with long runs.

Electrical current from an input power supply 51 is supplied to a critical panel breaker 52. The electrical current is supplied in three phases 51A, 51B, and 51C. Electrical current 51A is transmitted from the critical panel breaker 52 to an interface 53, hereinafter referred to as a power interface box. A neutral 54 and ground 55 of the input power supply 51 are also supplied to the power interface box 53. The neutral 54 and ground 55 form a neutral to ground bound 56. In addition, ground 55 is connected to a grounding electrode system 57 for the facility. The power interface box 53 transmits the electrical current 51A, the neutral 54, and the ground 55 from a female receptacle 84 to an uninterruptible power manager (UPM) 59, such as the POWERVAR 1440-11, via a male plug 69. The UPM 59 houses an uninterruptible power supply (UPS) 60 for providing a battery backup, an isolation transformer 61 for providing an isolated ground, a surge diverter (not shown) for diverting a high voltage transient, and a noise filter (not shown) for protecting against a high frequency normal mode noise. However, the uninterruptible power supply 60, the surge diverter (not shown), and the noise filter (not shown) are not necessary for the apparatus 50 to provide an isolated ground for isolated ground receptacles and may be eliminated if desired.

The electrical current is conditioned by the UPM 59 and transmitted from female receptacle 69A to the power interface box 53 via male plug 68. The conditioned electrical current is then transmitted to isolated ground receptacles 58A, 58B, and 58C. The isolation transformer 61 housed in the UPM 59 provides an isolated ground necessary for isolated ground receptacles 58A, 58B, and 58C by establishing a neutral to ground bond and preventing the transmission of a common mode voltage to the isolated ground receptacles 58A, 58B, and 58C.

The isolated ground established by the isolation transformer 61 is transmitted to the isolated ground receptacles 58A, 58B, and 58C via the power interface box 53. An isolated ground conductor 62 is run from the power interface box 53 to an isolated ground termination block 63. The isolated ground termination block 63 splits isolated ground conductor 62 into multiple isolated ground conductors 62A, 62B, and 62C. Isolated ground conductors 62A, 62B, and 62C are then run from the isolated ground termination block 63 to the isolated ground receptacles 58A, 58B, and 58C providing an isolated ground conductor free of electrical contamination. Critical electronics 64A, 64B, and 64C are then plugged into isolated ground receptacles 58A, 58B, and 58C to provide a battery backup to critical electronics 64A, 64B, and 64C.

Figure 4:
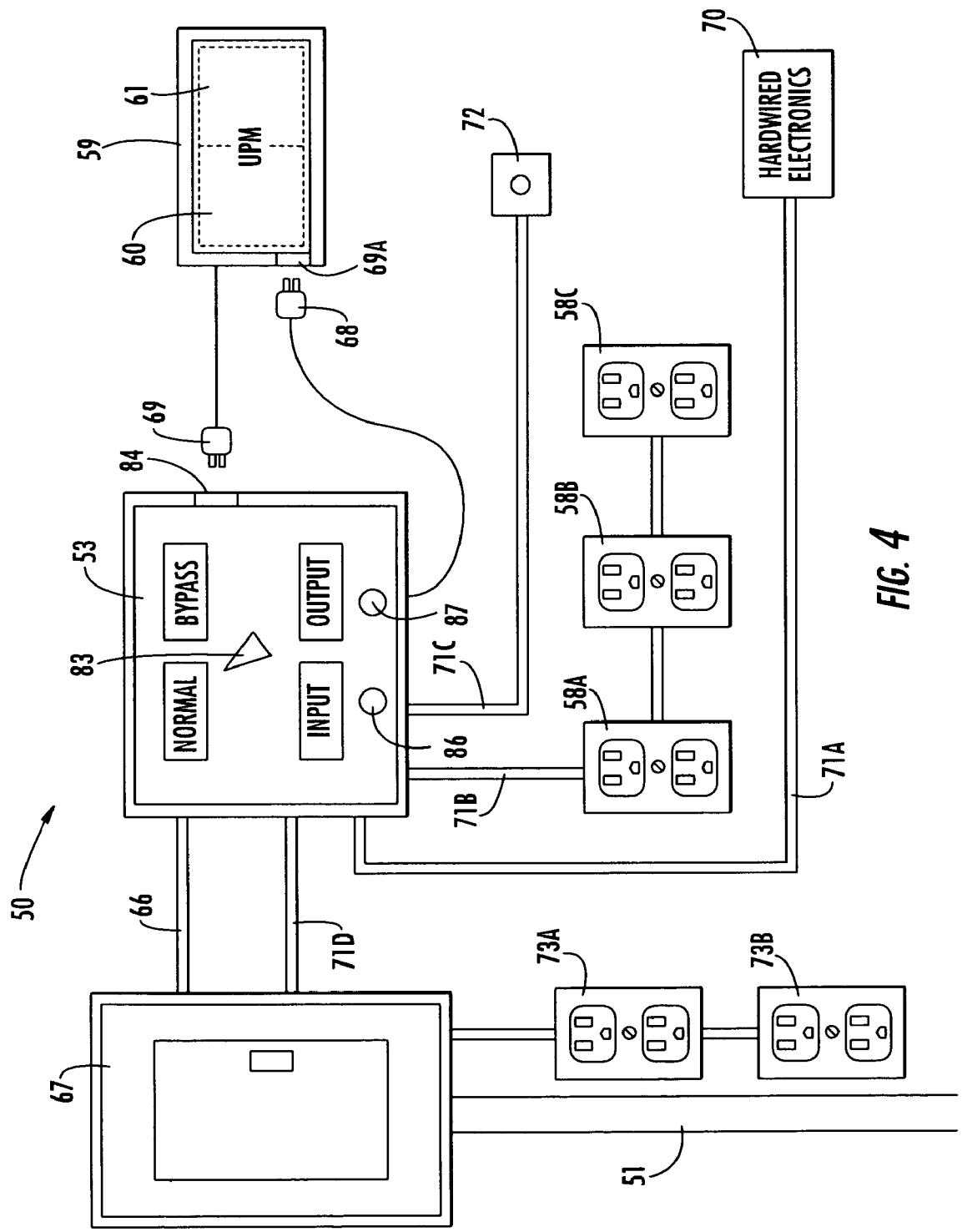
FIG. 4 shows a typical installation of the separately derived isolated ground interface apparatus according to the preferred embodiment of the present invention.

FIG. 4 shows a typical installation of the separately derived isolated ground interface apparatus 50 according to the preferred embodiment of the present invention. The apparatus 50 includes the power interface box 53, described in detail with reference to FIGS. 5 and 6. The power interface box 53 provides an interface between the input power supply 51, the uninterruptible power manager (UPM) 59, and isolated ground receptacles 58A, 58B, and 58C.

The input power supply 51 supplies electrical current to the power interface box 53 via an input conduit 66 running from a circuit breaker box (junction box) 67. The electrical current is transmitted from the power interface box 53 to the UPM 59 via male plug 69 running from the female receptacle 84 of the power interface box 53 to the UPM 59. The UPM 59 conditions the electrical current and then transmits the conditioned electrical current from the female receptacle 69A back to the power interface box 53 via male plug 68. The conditioned electrical current is then transmitted to isolated ground receptacles 58A, 58B, and 58C and hardwired electronic systems 70 electrically connected to the power interface box 53 by output conduits 71A and 71B.

Optionally, an emergency power off (EPO) switch 72 can be electrically connected to the power interface box 53 via output conduit 71C to shut the electrical current from the UPM 59 off in the event of an emergency. In addition, an output conduit 71D can be run from the power interface box 53 back to the junction box 67 to allow isolated ground receptacles 73A and 73B to be run directly from the junction box 67.

Figure 5:
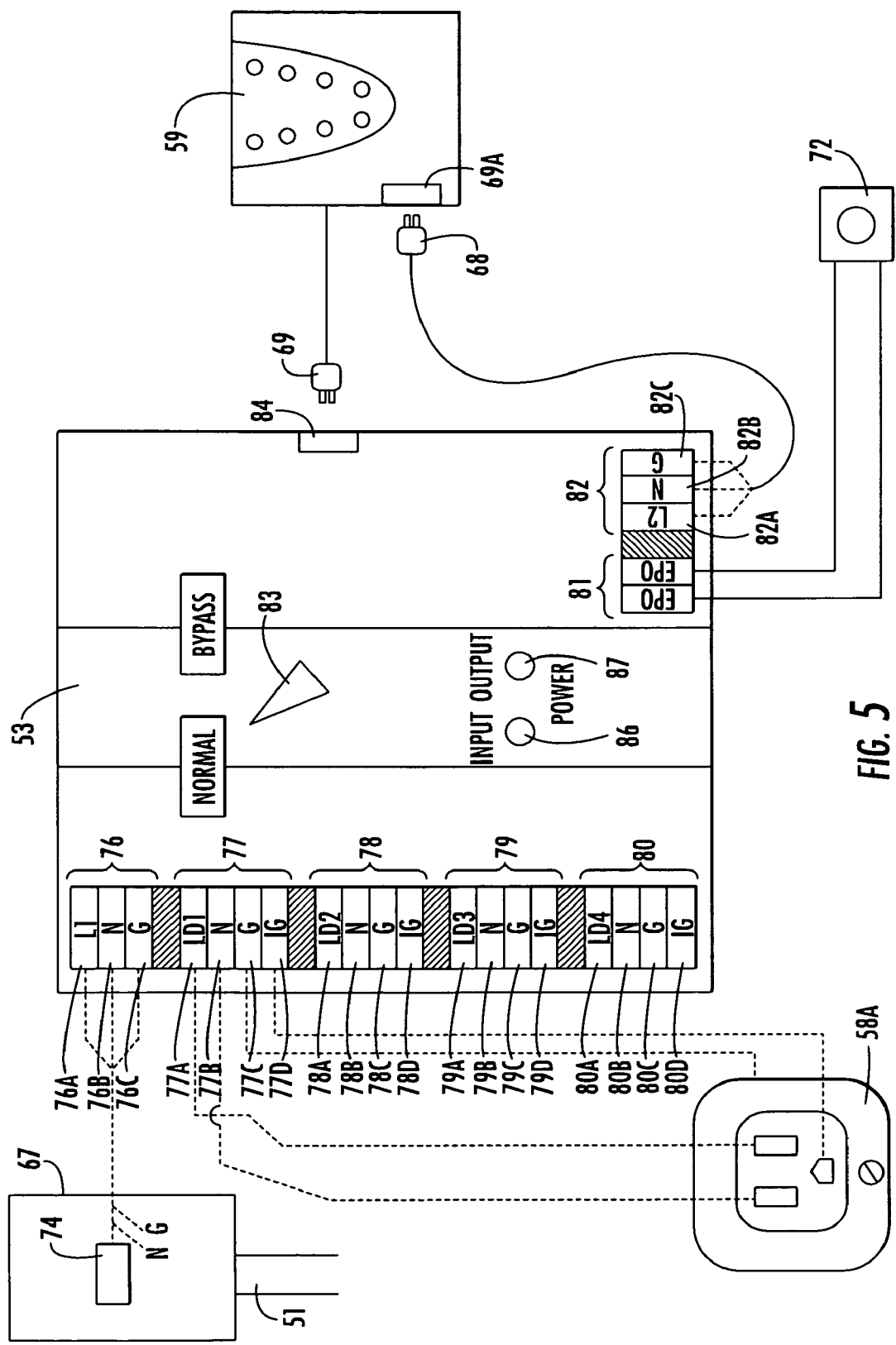
FIG. 5 shows a wiring diagram for connecting an input power supply, isolated ground receptacles, emergency power off switch, and an isolated transformer to the power interface box.

FIG. 5 shows the construction of the power interface box 53. The input power supply 51 supplies electrical current to the power interface box 53 by a single circuit breaker 74 housed in the junction box 67. The circuit breaker 74 is electrically connected to an input power termination block 76 within the power interface box 53. The power interface box 53 houses four output isolated ground termination blocks 77, 78, 79, and 80, for connecting isolated ground receptacles and/or hardwired loads, but any suitable configuration could be used. The output isolated ground termination blocks 77, 78, 79, and 80 allow up to three circuits to be installed on one termination block, resulting in a total of up to twelve circuits for four termination blocks. The power interface box 53 also includes an emergency power off (EPO) termination block 81 for installation of the optional EPO switch 72 and an input termination block 82 for connection to the UPM 59.

Figure 6:
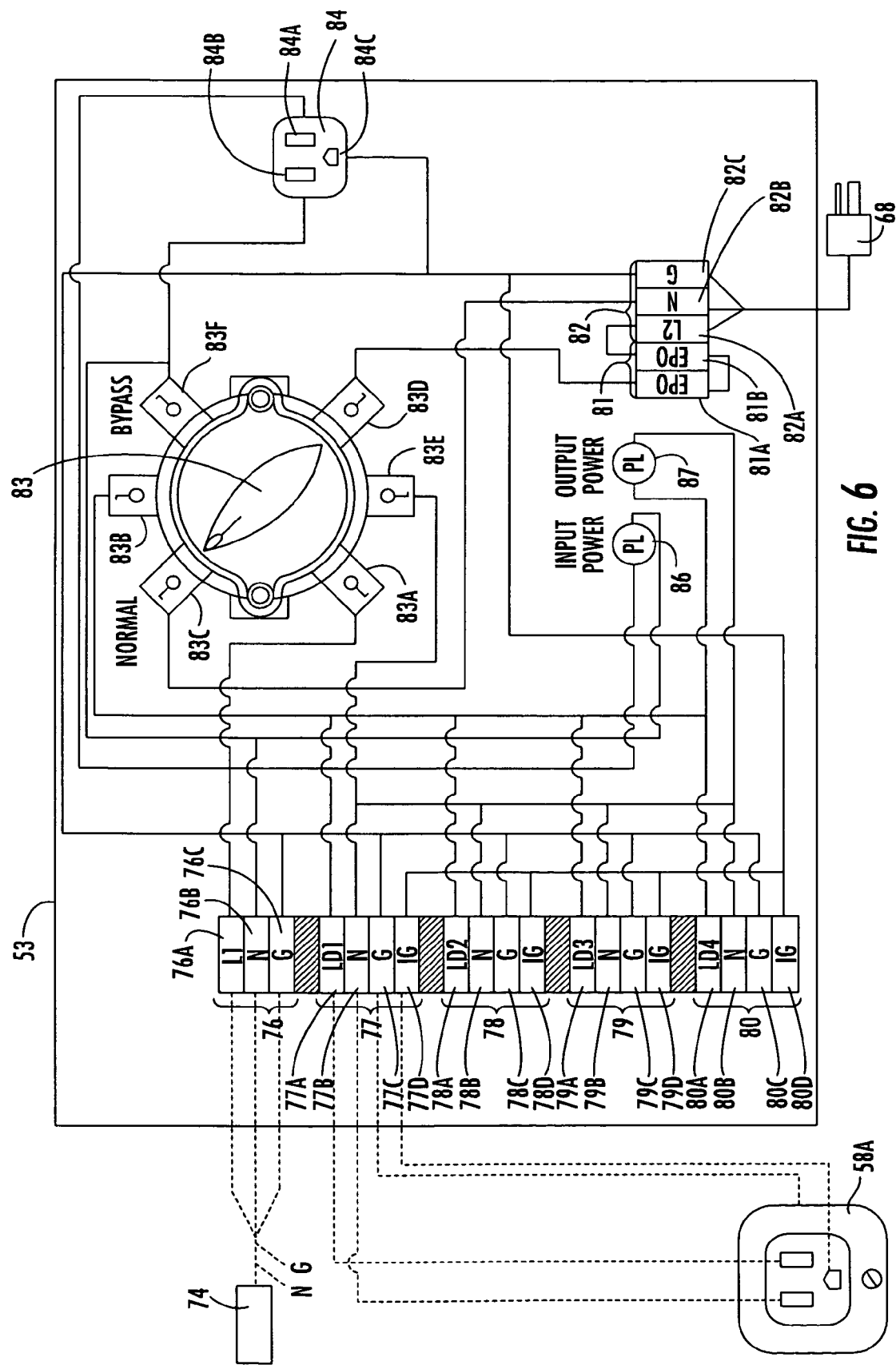
FIG. 6 shows a wiring diagram of the internal components of the power interface box operating in normal mode.
Figure 7:
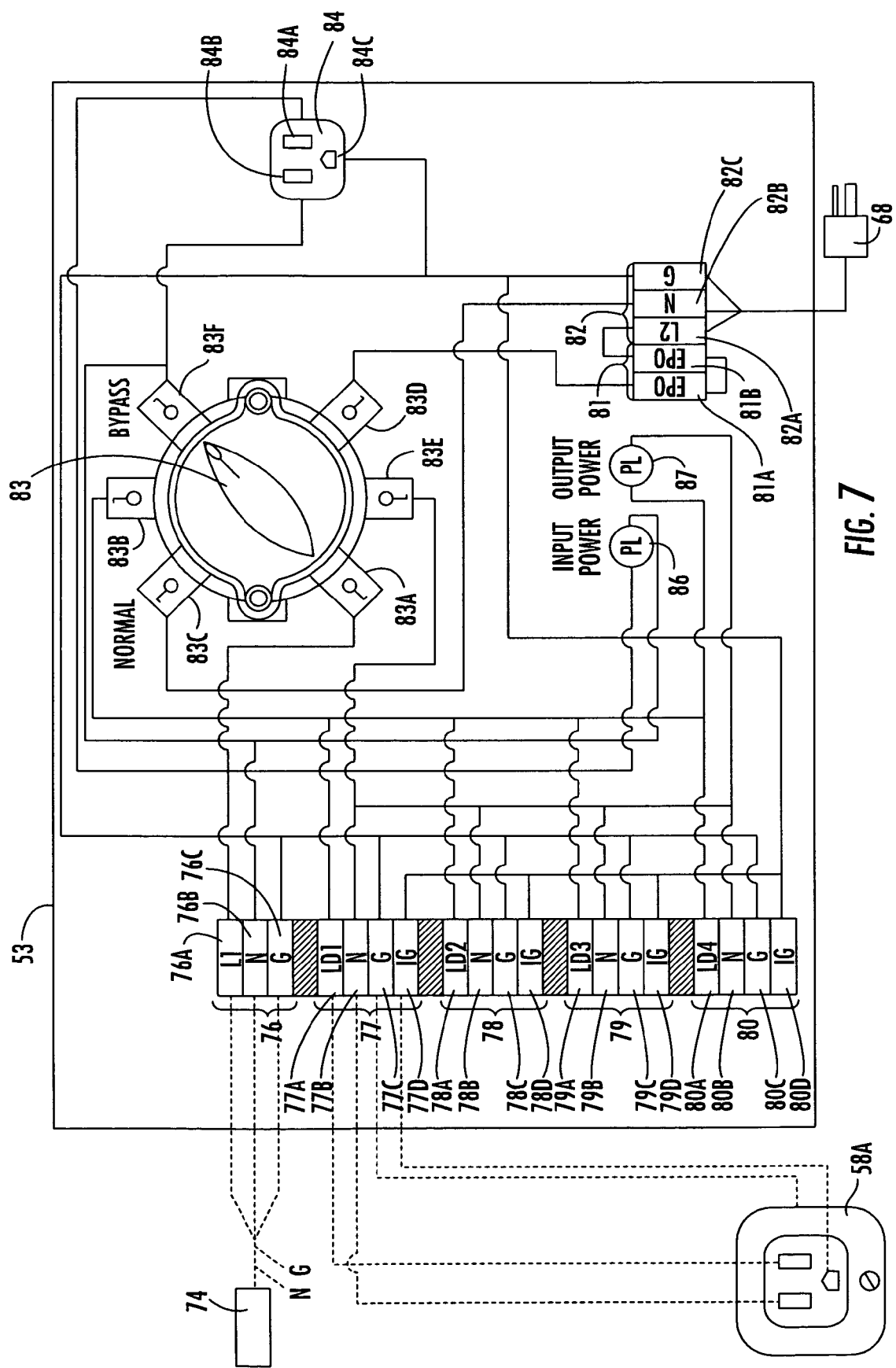
FIG. 7 shows a wiring diagram of the internal components of the power interface box operating in bypass mode.

Referring now to FIGS. 6 and 7, the power interface box 53 is designed to allow the UPM 59 to be bypassed with bypass switch 83 for service and maintenance. The electrical current supplied by the circuit breaker 74 is electrically connected to line "1" (L1) 76A, neutral 76B, and ground 76C terminals of the input power termination block 76. The Line "1" terminal 76A of the input termination block 76 is directly connected to the bypass switch 83 at contact 83A and an input power indicator light 86.

The neutral terminal 76B of the input power termination block 76 is electrically connected to the bypass switch 83 at contact 83F, a female receptacle 84 at terminal 84B, and the input power indicator light 86. The ground terminal 76C of the input power termination block 76 is electrically connected in parallel with ground terminals 77C, 78C, 79C, and 80C of the four isolated ground termination blocks 77, 78, 79, and 80. The ground terminal 76C of the input power termination block 76 is also electrically connected to the ground terminal 84C of the female receptacle 84. A line terminal 84A of the female receptacle 84 is also directly connected to the bypass switch 83 at contact 83A, the input power indicator light 86, and the line "1" terminal 76A of the input power termination block 76.

Load terminals 77A, 78A, 79A, and 80A of the isolated ground termination blocks 77, 78, 79, and 80 are electrically connected in parallel with each other and are then electrically connected to the bypass switch 83 at contact 83B and output power indicator 87. Isolated ground terminals 77D, 78D, 79D, and 80D of the isolated ground termination blocks 77, 78, 79, and 80 are electrically connected in parallel and are then electrically connected to ground terminal 82C of the UPM input termination block 82. Neutral terminals 77B, 78B, 79B, and 80B are electrically connected in parallel with each other and are then connected to the bypass switch 83 at contact 83E and output power indicator 87.

Line "2" (L2) terminal 82A of the UPM input termination block 82 is electrically connected to the bypass switch 83 at contact 83D via the EPO termination block 81. Ground terminal 82C is electrically connected to the parallel ground 84C and isolated ground 77D, 78D, 79D, and 80D terminals of the isolated ground termination blocks 77, 78, 79, and 80. Neutral terminal 82B is electrically connected to the bypass switch 83 at terminal 83C. The male plug 68 supplying electrical current from the UPM 59 is electrically connected to the line "2" 82A, neutral 82B, and ground 82C terminals of the UPM input termination block 82.

In operation, the circuit breaker 74 supplies unconditioned electrical current to terminal 76A of the input power termination block 76. The electrical current is then transmitted to the bypass switch 83 at contact 83A, the female receptacle 84 at terminal 84A, and to the input power indicator light 86. The neutral is transmitted to terminal 76B of the input power termination block 76 and to the bypass switch 83 at contact 83F, the female receptacle 84 at terminal 84B, and the input power indicator 86. The ground is connected to terminal 76C of the input power termination block and to ground terminals 77C, 78C, 79C, and 80C of the isolated ground termination blocks 77, 78, 79, and 80. The ground is also connected to ground terminal 84C of the female receptacle 84 and ground terminal 82C of the UPM input termination block 82.

Referring specifically to FIG. 6, in normal operation, the bypass switch 83 transmits electrical current to the female receptacle 84 via contacts 83A and 83F. The electrical current is then transmitted via the male plug 69 to the UPM 59 where it is conditioned. The conditioned electrical current is then transmitted back to the power interface box 53 from the UPM female receptacle 69A via the male plug 68. The UPM input termination block 82 supplies the conditioned electrical current to the bypass switch 83 at contact 83D to contact 83B, the conditioned neutral to the bypass switch 83 at contact 83C to contact 83E, and the isolated ground to ground terminal 82C of the input termination block 82 and ground terminals 77D, 78D, 79D, and 80D of the isolated ground termination blocks 77, 78, 79, and 80. The bypass switch 83 then transmits the conditioned electrical current to the load terminals 77A, 78A, 79A, and 80A of the four isolated ground termination blocks 77, 78, 79, and 80 via contact 83B. The bypass switch 83 then transmits the conditioned neutral to the load terminals 77B, 78B, 79B, and 80B of the four isolated ground termination blocks 77, 78, 79, and 80 via contact 83E.

Referring specifically to FIG. 7, in bypass operation, the bypass switch 83 eliminates the UPM input termination block 82 and male plug 68 and transmits the unconditioned electrical current directly to the load terminals 77A, 78A, 79A, and 80A of the isolated ground termination blocks 77, 78, 79, and 80 via contacts 83B and the neutral load terminals 77B, 78B, 79B, and 80B of the isolated ground termination blocks via contact 83E.

Optionally, the emergency power off (EPO) switch 72 can be electrically connected to EPO terminals 81 by removing a wire jumper between a bottom side of terminals 81A and 81B and installing the EPO switch 72 in a normally-closed (N/C) wiring configuration. When the EPO switch 72 is activated, the electrical current is removed from terminals 81A and contact 83D of the bypass switch 83, which removes the current from terminal 83B of bypass switch 83 and line terminals 77A, 78A, 79A, and 80A of the isolated ground termination blocks 77, 78, 79, and 80.

A separately derived isolated ground interface apparatus utilizing a power interface box capable of providing an interface between an isolation transformer and a remote, hard wired isolated ground receptacle is described above. Various details of the invention may be changed without departing from its scope. Furthermore, the foregoing description of the preferred embodiments of the invention and the best mode for practicing the invention are provided for the purpose of illustration only and not for the purpose of limitation, the invention being identified in the claims.

I claim:

1. A centralized isolated ground interface apparatus for providing a remote termination point for isolated ground conductors, comprising:

(a) an isolation transformer for establishing a neutral to ground bond and thereby preventing transmission of a common mode voltage from an input power supply to an electrical device;

(b) a plurality of isolated ground receptacles located in remote locations with respect to the isolation transformer for providing a separate ground reference point for each of the receptacles from a chassis ground and for preventing transmission of electrical noise to the electrical device;

(c) an electrical interface for electrically interconnecting the isolation transformer, the input power supply, and the plurality of isolated ground receptacles together, whereby the input power supply transmits an electrical current through the electrical interface to the isolation transformer, the isolation transformer providing an isolated ground through the electrical interface to the isolated ground conductors electrically connected to the separate ground reference point of the plurality of isolated ground receptacles; and (d) a bypass switch for bypassing the isolation transformer for allowing service and maintenance to be performed without disrupting the electrical current transmitted to the plurality of isolated ground receptacles.

2. The isolated ground interface apparatus according to claim 1, and further comprising a remote, manually-operable emergency power off switch for disconnecting the electrical current supplied from the isolation transformer to the plurality of isolated ground receptacles.

3. The isolated ground interface apparatus according to claim 2, wherein the electrical interface includes an emergency power off termination block for electrically hard-wire connecting the emergency power off switch for disconnecting the electrical current supplied from the isolation transformer to the plurality of isolated ground receptacles.

4. The isolated ground interface apparatus according to claim 1, wherein the electrical interface includes an input power termination block for electrically hard-wire connecting the electrical current supplied by the input power supply to the electrical interface.

5. The isolated ground interface apparatus according to claim 1, wherein the electrical interface includes a female receptacle for receiving a male plug from the isolation transformer.

6. The isolated ground interface apparatus according to claim 1, wherein the electrical interface includes a male plug for connecting the electrical interface to the isolation transformer.

7. The isolated ground interface apparatus according to claim 1, wherein the electrical interface includes a plurality of isolated ground termination blocks for electrically hard-wire connecting the plurality of isolated ground receptacles to the electrical interface.

8. The isolated ground interface apparatus according to claim 1, wherein the electrical device comprises an electronic device selected from the group consisting of point of sale networks, fueling management systems, computer networks, telecom systems, security systems, automatic teller machines, and internet kiosks.

9. A centralized isolated ground interface apparatus for providing a remote termination point for isolated ground conductors, comprising:

(a) an isolation transformer for establishing a neutral to ground bond and thereby preventing transmission of a common mode voltage from an input power supply to a plurality of electronic devices;

(b) a battery backup for providing an uninterruptible power supply to the plurality of electronic devices;

(c) a plurality of isolated ground receptacles for providing a separate ground reference point for each of the receptacles from a chassis ground for preventing transmission of electrical noise to the plurality of electronic devices, wherein the plurality of isolated ground receptacles are located in remote locations with respect to the isolation transformer; and (d) an electrical interface for electrically interconnecting the isolation transformer, the input power supply, and the plurality of isolated ground receptacles together, whereby the input power supply transmits an electrical current through the electrical interface to the isolation transformer, the isolation transformer providing an isolated ground through the electrical interface to the isolated ground conductor electrically connected to the separate ground reference point of the plurality of isolated ground receptacles, the electrical interface comprising:

(i) a plurality of isolated ground termination blocks for electrically connecting the plurality of isolated ground receptacles to the electrical interface;

(ii) an input power termination block for electrically hard-wire connecting the electrical current supplied by the input power supply to the electrical interface;

(iii) a female receptacle for receiving a male plug from the isolation transformer; and (iv) a bypass switch for bypassing at least one of the isolation transformer and the battery backup for allowing service and maintenance to be performed without disrupting the electrical current transmitted to the isolated ground receptacles.

10. The isolated ground interface apparatus according to claim 9, and further comprising a remote emergency power off switch for disconnecting the electrical current supplied by the battery backup to the plurality of isolated ground receptacles.

11. The isolated ground interface apparatus according to claim 10, wherein the electrical interface includes an emergency power off termination block for electrically hard-wire connecting the emergency power off switch for disconnecting the electrical current supplied from the isolation transformer to the isolated ground receptacles.

12. The isolated ground interface apparatus according to claim 9, wherein the electrical interface includes a male plug for electrically connecting the electrical interface to a device selected from the group consisting of an isolation transformer and a back-up battery.

13. An electrical interface for a centralized isolated ground interface apparatus having an isolation transformer, a battery backup, an input power supply, and a plurality of isolated ground receptacles located in remote locations with respect to the isolation transformer, the electrical interface comprising:

(a) an input power termination block for electrically hard-wire connecting an electrical current supplied by the input power supply to the electrical interface;

(b) a plurality of isolated ground termination blocks for electrically hard-wire connecting the plurality of isolated ground receptacles to the electrical interface;

(c) a male plug for connecting the electrical interface to the isolation transformer;

(d) a female receptacle for receiving a male plug from the isolation transformer; and a bypass switch for bypassing at least one of the isolation transformer and a battery backup for allowing service and maintenance to be performed without disrupting the electrical current transmitted to the plurality of isolated ground receptacles.

14. The electrical interface according to claim 13, and further comprising an emergency power off termination block for electrically hard-wire connecting an emergency power off switch for disconnecting the electrical current supplied by the input power supply from the isolation transformer.

15. A method of providing electrical current supplied by an input power supply, comprising an outside source of utility power and a back-up battery, to a plurality of isolated ground receptacles through an isolation transformer using an electrical interface, the plurality of isolated ground receptacles located in remote locations with respect to the isolation transformer, the electrical interface having:
  (a) a normal mode, wherein the steps of transmitting electrical current to the plurality of isolated ground receptacles in the normal mode comprises:
    (i) transmitting the electrical current from the input power supply to the electrical interface for transmission of the electrical current to the isolation transformer;
    (ii) transmitting the electrical current from the electrical interface to the isolation transformer for establishing a neutral to ground bond and thereby preventing transmission of a common mode voltage from the input power supply to an electrical device;
    (iii) transmitting the electrical current from the isolation transformer to the electrical interface for transmission of the electrical current to the plurality of isolated ground receptacles;
    (iv) transmitting the electrical current from the electrical interface to the plurality of isolated ground receptacles for transmission of the electrical current to the electrical device; and
  (b) a bypass mode, wherein the steps of transmitting electrical current to the plurality of isolated ground receptacles in bypass mode comprises:
    (i) bypassing the back-up battery and supplying the electrical current supplied by the outside utility input power supply to the electrical interface for transmission of the electrical current directly to the plurality of isolated ground receptacles for preventing power shut-down to the electrical device during back-up battery maintenance and replacement; and
    (ii) transmitting the electrical current from the electrical interface to the plurality of isolated ground receptacles for transmission of the electrical current to the electrical device.

16. The method according to claim 15, wherein the electrical device comprises an electronic device selected from the group consisting of point of sale networks, fueling management systems, computer networks, telecom systems, security systems, automatic teller machines, and internet kiosks.

* * * * *